April 16, 1963  W. M. CHAMPION  3,085,423
LEAK DETECTION
Filed Oct. 28, 1958
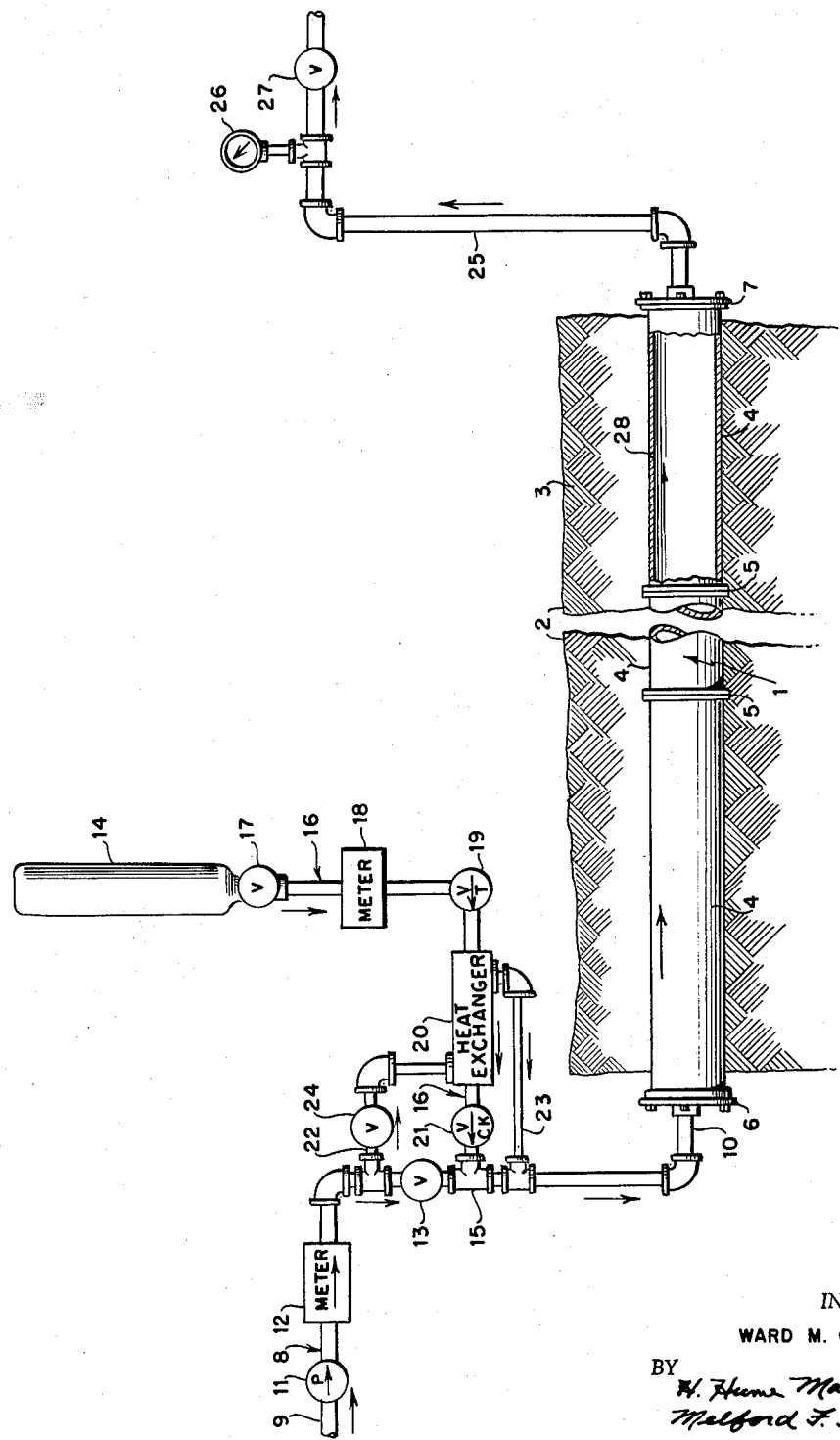
INVENTOR.
WARD M. CHAMPION
BY
*H. Hume Mathews*
*Melford F. Tietge*
ATTORNEY & AGENT 3,085,423
LEAK DETECTION
Ward M. Champion, Shreveport, La., assignor to Air Reduction Company, Incorporated, New York, N.Y., a corporation of New York
Filed Oct. 28, 1958, Ser. No. 770,125
8 Claims. (Cl. 73—40.5)

This invention relates to the art of leak detection and more particularly to an improved method of detecting leaks in vessels.

The method of this invention has wide application. It is capable of being advantageously practiced in the detection of leaks in various types of vessels which are adapted to contain and/or transmit fluids and which are located above ground or underground. The invention is especially useful in detecting leaks in underground pipelines, such as those employed in transmitting natural gas or other hydrocarbon fluids from one place to another. Accordingly and by way of example, the ensuing discussion and description will be directed to the applicability of the invention to the detection of leaks in an underground natural gas pipeline.

Natural gas pipelines are usually made of individual pipe sections, ranging in diameter from a few inches to 30 inches and having welded longitudinal seams. The pipe sections are arranged end to end with their abutting ends welded together and sealed and are laid in a trench formed in the earth with the longitudinal seams along the top. The depth of the trench depends on the diameter of a particular pipeline. In the case of a 30 inch pipeline, the trench is usually about 5 feet deep. After a length of the pipeline is laid in the trench, the pipe is covered and the trench is filled with soil. Having reference to a 30 inch pipeline that is laid in a 5 foot deep trench, the soil fill in the trench above the pipeline is generally approximately 2½ feet deep.

It is both desirable and essential that a pipeline be fluid-tight to prevent the escape of fluid through the walls of individual sections or through joints between successive sections. For this reason, it is important that selected lengths of a pipeline be adequately tested for leaks prior to being placed in active service. Such testing usually involves subjecting the selected lengths of pipeline to relatively high hydrostatic pressures.

Various procedures and materials for detecting leaks in pipelines have been proposed and tried but none has proven practicable from the dual viewpoints of economy and satisfactory results.

The primary object of the invention is to provide an improved method for effectively testing vessels, particularly underground pipelines, for leaks.

Another object of the invention is to provide an economical and dependable method of detecting leaks which are not normally visible, in underground pipelines and the like.

Another object of the invention is to provide a method of hydrostatically testing pipelines and the like, whereby to enable of prompt and accurate determination of the origin of leaks, even of leaks of relatively small size, when the escaping hydrostatic testing fluid does not produce a visible indication as to the location of the leak.

Another object of the invention is to provide a method of the character indicated in which a hydrostatic fluid is impregnated with a noncorrosive, stable, nontoxic gas which is capable of dissolving in the hydrostatic fluid and which upon escaping from the vessel being tested is evolved therefrom and may be detected in extremely small concentrations without interference from gases normally found in the atmosphere.

A further object of the invention is to detect leaks in vessels, such as underground pipelines and the like, by employing a hydrostatic testing fluid comprising a mixture of water and nitrous oxide dissolved therein.

A preferred and recommended method of detecting leaks in an underground pipeline according to this invention comprises filling a selected length of the pipeline with a test fluid mixture, comprising water and nitrous oxide dissolved therein, placing the test fluid mixture under pressure to subject the pipe to a predetermined hydrostatic test pressure and analyzing the atmosphere above the soil covering the pipe for the presence of nitrous oxide gas. The nitrous oxide when utilized in this manner escapes with the hydrostatic liquid through any leak that may occur under the hydrostatic testing pressure into the surrounding soil and evolves and passes upwardly through the soil to the atmosphere. It is possible to ascertain the existence of a leak with the escape of extremely minute amounts of the nitrous oxide by means of infra-red detection methods such as are well known and for which there are commercially available detecting devices having a sensitivity for indicating the presence of nitrous oxide when present in concentrations as low as 5 parts per million in air. Such devices respond substantially instantaneously to the sample gas so that with a detector of this type any trace of nitrous oxide may be readily ascertained at a point substantially directly above a leak in the line.

A sufficient concentration of the nitrous oxide is required in the testing fluid mixture so that, upon escape of part of the fluid mixture from the vessel under test, a detectable concentration of the nitrous oxide in the atmosphere above the ground will result. Advantageously, an amount of nitrous oxide that may be used to accomplish this result is slightly in excess of the amount which corresponds to that which is capable of saturating the testing fluid at atmospheric pressure and at the prevailing temperature conditions. Such slight excess will insure the evolution of corresponding amounts of the nitrous oxide upon the escape of the testing fluid when its pressure is lowered to that of the atmosphere. It is also desirable in introducing the impregnated testing fluid into the pipeline to do so under a static head at least slightly above atmospheric pressure so as to deter flash evolution of the nitrous oxide from the testing fluid as it is introduced into the test vessel.

The present invention affords a particularly desirable and reliable method for detecting leaks in pipelines and is especially effective in detecting leaks occurring under hydrostatic testing that are not traceable by direct visual observation of the escaped fluid. In conventional hydrostatic testing, the hydrostatic fluid itself, provided the leak is of sufficient size and the soil in the vicinity thereof is conducive to such result, may rise to the surface and, thus, permit the source of the liquid to be directly ascertained. However, it is frequently the case that the escaped hydrostatic testing liquid does not rise to the surface of the soil in this manner possibly because the leak itself is extremely small and thus, discharges only a limited quantity of the fluid that drains downwardly into the substrata rather than rising to the surface. Also the soil may be so porous that even with relatively large leaks the hydrostatic fluid either does not rise to the surface or does so only after a relatively long delay. It will be apparent that the rapid and effective detection of leaks of small size or in localities having adverse soil conditions, which has not heretofore been satisfactorily afforded by presently known methods, is readily accomplished in accordance with the present invention inasmuch as the nitrous oxide dissolved in the hydrostatic fluid effectively permeates the surrounding soil, rises to the surface thereof and, even in extremely small concentrations, may be reliably detected by sensitive infra-red detection means.

The enumerated objects and other objects, together with the advantages of the invention, will be readily apparent to persons skilled in the art from the following detailed description taken in conjunction with the accompanying drawing which depicts an arrangement of apparatus for use in detecting leaks in an underground pipeline in accordance with the method of this invention.

Referring now to the drawing, a length of pipeline to be tested, identified by numeral 1, is buried beneath the surface 2 of earth 3. The pipeline is made up of pipe sections 4 which are disposed in end to end relation, as shown, to obtain a series of abutting joints 5 which are suitably joined, such as by welding, to form fluid-tight connections. The ends of the pipeline are provided with corresponding cover plates 6 and 7 each of which has a central through opening (not shown).

A conduit 8 has an end portion 9 which is adapted to be connected to a suitable source of water supply (not shown). The other end 10 of the conduit is connected to cover plate 6 and communicates with the interior of pipeline 1 by way of the opening in that cover plate. A positive displacement pump 11 and a liquid flow meter 12 are arranged in series in conduit 8, as illustrated. Pump 11 is adapted to transmit water from the source of supply through conduit 8 and into pipeline 1 as allowed by a control valve 13.

A tank 14 communicates with conduit 8 through a T-connection 15 downstream of meter 12 by way of a conduit 16 which has a plurality of series-connected devices therein. Such devices consist of a discharge valve 17 carried by tank 14, a fluid meter 18, a throttle valve 19, a heat exchanger 20 and a check valve 21. Tank 14 contains liquid nitrous oxide. Valve 17 controls the discharge of the liquid nitrous oxide from tank 14 into conduit 16. Meter 18 measures the flow of liquid nitrous oxide through the conduit. Throttle valve 19 controls fluid flow between meter 18 and heat exchanger 20 and reduces the pressure of the nitrous oxide. Heat exchanger 20 raises the temperature of the nitrous oxide before it is introduced into conduit 8. A stream of the water supplied by conduit 8 is bypassed around connection 15 and through the heat exchanger by way of conduits 22 and 23. Conduit 22 is provided with a control valve 24. It will be apparent from examination of the drawing that the rate of water flow through the heat exchanger is determined by the setting of valves 13 and 24. The water flowing through the heat exchanger imparts sensible heat to the nitrous oxide thereby raising the temperature of the nitrous oxide and preventing freezing of the water in the region of connection 15. Check valve 21 prevents back flow of fluid through conduit 16.

While the expanded nitrous oxide stream through heat exchanger 20 is shown as being heated to avoid freezing water at the region of connection 15 by heat exchange with a divided portion of the water flow from conduit 8, it will be understood that such heating might be accomplished in other ways. For example, the exchanger may be satisfactorily designed to absorb and impart sufficient heat to the nitrous oxide stream directly from the surrounding ambient air.

Fluid admitted into pipeline 1 through conduit 8 is normally discharged therefrom by means of a conduit 25 which is provided with a pressure gauge 26 and a control valve 27 downstream of the pressure gauge.

For the purpose of outlining the method of the invention in connection with testing the pipeline shown in the drawing, it is assumed that the pipeline has a 30 inch diameter and is buried 5 feet below ground surface 2. Accordingly, the soil above the pipeline has a mean depth of approximately 2½ feet. It is also assumed that conduit 8 is connected to the source of water supply and that tank 14 contains liquid nitrous oxide that is at a pressure of about 700 pounds per square inch.

As a rule, the line to be tested will have been filled previously with water and will have been submitted to a conventional hydrostatic test. It may be presumed that in such testing a leak in the line has been shown to exist but that its exact location has not been ascertained. It will be understood that the existence of the leak will be evident by the fact that the continuous delivery of liquid is required in order to maintain the hydrostatic testing pressure. The rate at which the liquid is delivered, of course, will be an indication of the size of the total leakage of the test section. If the leak is extremely small or the soil relatively porous, as previously mentioned, such leaks would ordinarily not be directly noted by visual examination of the soil immediately above the pipe. At the outset, the pipe will ordinarily be filled with the previous test fluid and in carrying out the present invention as hereinafter described, it will be seen that the test fluid mixture utilized according to the present invention is delivered to the length of pipeline to be tested and progressively displaces the previous test fluid from the pipeline.

Pump 11 is placed in service, thereby transmitting water through conduit 8 and heat exchanger 20 in the directions indicated by the arrows, and valve 17 is opened, thereby discharging liquid nitrous oxide from tank 14, through conduit 16 and into conduit 8. Both the water and nitrous oxide are metered by meters 12 and 18, respectively. The nitrous oxide is introduced into the water at connection 15 and is dissolved therein to obtain a fluid mixture of water and nitrous oxide. The water which is bypassed through the heat exchanger becomes part of the fluid mixture.

During the introduction of the fluid mixture into the pipeline, the pressure therein is maintained at approximately 30 pounds per square inch absolute by controlling valve 27 to allow the liquid initially in the pipeline to be displaced therefrom by the test fluid mixture. When the pipeline is filled with the test fluid mixture, valves 27 and 17 are closed. Such filling of the pipeline by the test fluid mixture will be indicated, for example, when nitrous oxide is detectable in the liquid discharged through valve 27. The closing of valve 27 terminates discharge through conduit 25. The closing of valve 17 interrupts the flow of nitrous oxide to conduit 8.

A sufficient amount of additional water is next pumped through conduit 8 by pump 11 to raise the pressure of the fluid mixture in the pipeline to the desired test pressure which may be, for example, 1300 pounds per square inch.

If the pipeline has one or more leaks in its walls or joints, such as leak 28, some of the fluid mixture will be discharged therethrough and into the adjacent soil due to the superior pressure within the pipeline. Nitrous oxide in the wetted soil is evolved and escapes into the atmosphere above the leak. The presence of nitrous oxide in the atmosphere is ascertained by an infra-red detector or other suitable device for receiving and analyzing relatively small traces of nitrous oxide. It will be appreciated that inspection for leaks may be readily carried out by an inspector walking along the ground above the pipeline and carrying an infra-red detector.

The above described embodiment of the present invention contemplates testing a pipeline that is initially filled with water. It will be understood, of course, that the utilization of the invention need not be limited to this use. Thus, the present method may also be used in the testing of a pipeline which initially contains only air or, for that matter, any fluid or gas which will in turn eventually be displaced with the testing fluid employed in carrying out the present invention in substantially the same manner that has been above described. Of course, where the pipeline is initially filled with gas, it is desirable that any gas pockets that might develop be completely vented. Such pockets might occur, for example, along the length of the line where the grade line produces sections that are relatively elevated with respect to the adjacent portions of the pipe length. Any suitable manner of bleeding such gas pockets may be applied as will be understood by those skilled in the art in order that the entire pipe will be filled with the hydrostatic testing fluid. In such mode of operation, it will be seen also that the valve 27 may be employed in the same manner as hereinabove described to permit the bleeding of the gas within the test length of the pipeline to the atmosphere so as to maintain a desired pressure within the pipeline sufficient to deter flash evolution of nitrous oxide vapors from the test fluid upon its introduction into the pipeline.

The saturation concentration of nitrous oxide in water at a pressure of one atmosphere and 21° C. is 0.65 volume of nitrous oxide per volume of water. At a pressure of two atmospheres, the solubility of nitrous oxide in water is approximately twice that at one atmosphere or 1.30 volumes per volume of water. For example, if 0.975 volume of nitrous oxide is dissolved in one volume of water (0.11 pound of nitrous oxide per cubic foot of water) and the mixture is allowed to leave the pipeline 1 through a conventional leak at the rate of approximately 16 gallons of water per hour, a sufficient quantity of nitrous oxide will rise to the surface of the ground through a distance of 5 feet to give a positive test for nitrous oxide in a few minutes time.

While the method of the invention has been specifically described in connection with the testing of underground pipelines, it is to be borne in mind that the method is also applicable to testing other types of vessels and regardless of whether a particular vessel is disposed above ground or buried. It is recognized that the method is especially useful in the detection of leaks which are normally invisible.

For the purposes of the present invention, any suitable infra-red dector may be utilized. It is desirable that such detector have a sensitivity capable of detecting the presence of nitrous oxide in the atmosphere in concentrations as low as about 5 parts per million. The use of infra-red detection and the employment of nitrous oxide as a testing fluid in the present invention cooperate to afford significant advantages in accomplishing the objects of the present invention. Thus, the nitrous oxide gas is highly desirable due to its noncorrosive effect, its nontoxicity and its ability to dissolve readily in suitable concentrations in the testing fluid mixture and to be liberated from the mixture and permeate through the overlying strata of soil so as to reach the surface of the ground in sufficient amounts to render the leak detectable. The infra-red technique meanwhile is extremely sensitive to the presence of very small concentrations of nitrous oxide and in application to this gas is not subject to interference or sensitivity from extraneous gases that would ordinarily be present in the atmosphere. The infra-red method of detection, as is well known, utilizes the ability of nitrous oxide to absorb radiation in the infra-red spectra. Detecting devices embodying the principle may, for example, provide a reference sample of gas and a test sample which is taken from the atmosphere, in which the presence of nitrous oxide is to be determined and light in the infra-red spectra is passed through both gases in which the energy absorption will differ as a function of the nitrous oxide contained in the test sample. The difference in any energy absorption, of course, affords a source for the production of a suitable calibration in terms of the concentration of nitrous oxide. It will be evident that such devices need not be described in detail since they are generally well known. Among the suitable commercially available infra-red detectors is one manufactured and marketed by Perkin-Elmer Corporation, Norwalk, Connecticut.

It will be appreciated that various changes may be made in the apparatus employed and the details of the procedures disclosed herein without departing from the invention or sacrificing any of its advantages. Accordingly, it is to be understood that all matter contained herein shall be interpreted as being illustrative and explanatory, rather than in a limiting sense.

What is claimed as new and desired to be secured by Letters Patent of the United States is as follows:

1. In a method of detecting leaks in an underground vessel, the steps of introducing into the vessel a noncorrosive, nontoxic, essentially liquid composition comprising a normally liquid aqueous medium and nitrous oxide dissolved therein, placing said liquid composition under a desired test pressure and analyzing the atmosphere at about the surface of the ground and above the vessel for the presence of nitrous oxide liberated from said liquid composition to determine the existence of leaks in the vessel.

2. In a method of detecting leaks in an underground vessel, the steps of introducing into the vessel a noncorrosive, nontoxic, essentially liquid composition comprising water and nitrous oxide dissolved therein, maintaining the pressure of the liquid composition in the vessel at a pressure substantially above atmospheric pressure and analyzing the atmosphere at about the surface of the ground and above the vessel for the presence of nitrous oxide liberated from said liquid composition to determine the existence of leaks in the vessel.

3. In a method of detecting leaks in an underground vessel, such as a buried pipeline, the steps of introducing into the vessel at a pressure above atmospheric pressure a noncorrosive, nontoxic, essentially liquid composition comprising water and nitrous oxide dissolved therein in an amount sufficient to substantially fill the vessel, raising the pressure of the liquid composition in the vessel to a desired hydrostatic test pressure and analyzing the atmosphere at about the surface of the ground and above the vessel for the presence of nitrous oxide liberated from said liquid composition to determine the existence of leaks in the vessel.

4. In a method of detecting leaks in an underground vessel, such as a buried pipeline, the steps of introducing into the vessel an essentially liquid composition comprising water and nitrous oxide dissolved in the water at a pressure of at least 30 pounds per square inch absolute in an amount sufficient to substantially fill the vessel, raising the pressure of the liquid composition in the vessel to a desired hydrostatic test pressure and analyzing the atmosphere at about the surface of the ground and above the vessel for the presence of nitrous oxide liberated from said liquid composition to determine the existence of leaks in the vessel.

5. In a method of detecting leaks in an underground vessel, such as a buried pipeline, the steps of introducing into the vessel an essentially liquid composition comprising water and nitrous oxide dissolved in the water at a pressure of at least 30 pounds per square inch absolute in an amount sufficient to substantially fill the vessel, raising the pressure of the liquid composition in the vessel by means of a liquid comprising water to a desired hydrostatic test pressure to which the vessel is to be subjected in use, and analyzing the atmosphere at about the surface of the ground and above the vessel for the presence of nitrous oxide liberated from said liquid composition to determine the existence of leaks in the vessel.

6. In a method of detecting leaks in a vessel, utilizing an essentially liquid composition comprising a normally liquid medium and nitrous oxide dissolved therein as a testing liquid, the steps of delivering a stream of expanded gaseous nitrous oxide gas from a pressurized liquid source of nitrous oxide, admixing said nitrous oxide stream in controllable proportions with a stream of said liquid medium, heating said gaseous nitrous oxide stream prior to admixing at least sufficiently to prevent solidification of said liquid medium upon contact with said nitrous oxide stream, introducing said thus formed liquid composition into a vessel to be tested, placing said liquid composition under a desired test pressure and analyzing the environment exterior of the vessel for the presence of nitrous oxide to determine the existence of leaks in the vessel.

7. The method of locating the site of the leak in an elongated section of a buried pipeline when subjected to hydrostatic test at elevated testing pressure, comprising introducing into said pipeline section a liquid hydrostatic-test solution comprising nitrous oxide dissolved in water, raising the pressure of said solution to hydrostatic test pressure, traversing the length of said pipeline section and testing the atmosphere along said traverse, above the ground covering said buried pipeline, by infra-red analysis to detect the presence of nitrous oxide liberated from said test solution and thereby locate the site of any leak in said buried pipeline section.

8. The method of hydrostatically testing an underground pipeline and locating leaks therein without the necessity of uncovering said pipeline, comprising charging said pipeline with a test solution of $N_2O$ dissolved in water, subjecting the test solution to hydrostatic pressure to effect a discharge of said test solution through a leak in said pipeline and determining the position of said leak along the length of said pipeline by progressively sampling the atmospheric gases in the region above said pipeline along the length thereof to detect the presence of gaseous $N_2O$ that has evolved from said discharged test solution and permeated the ground covering said pipeline.

References Cited in the file of this patent

UNITED STATES PATENTS

| | | |
|---|---|---|
| 2,266,566 | Poole | Dec. 16, 1941 |
| 2,633,739 | Potts | Apr. 7, 1953 |
| 2,878,392 | Polito | Mar. 17, 1959 |
| 2,879,663 | Thomas | Mar. 31, 1959 |

FOREIGN PATENTS

| | | |
|---|---|---|
| 733,348 | Great Britain | July 13, 1955 |

OTHER REFERENCES

"Ohio Chemical Technical Information Series 1 Nitrous Oxide for Lead Detection A," May 7, 1957.

"Ohio Chemical Technical Information Series 1 Nitrous Oxide for Lead Detection B," Sept. 7, 1957.

General Electric Review, October 1949, pp. 41–44.